United States Patent [19]
Uchikoshi

[11] Patent Number: 5,065,080
[45] Date of Patent: Nov. 12, 1991

[54] CONTROL SYSTEM

[75] Inventor: Gohji Uchikoshi, Tokyo, Japan

[73] Assignee: Nakamichi Corporation, Kodaira, Japan

[21] Appl. No.: 671,669

[22] Filed: Mar. 19, 1991

Related U.S. Application Data

[63] Continuation of Ser. No. 271,727, Nov. 15, 1988, abandoned.

[30] Foreign Application Priority Data

Nov. 16, 1987 [JP] Japan .................................. 63-288661

[51] Int. Cl.$^5$ ............................................. G05B 5/01
[52] U.S. Cl. .................................. 318/611; 318/609; 318/610; 318/621
[58] Field of Search ................ 318/611, 609, 610, 621; 330/260; 315/403

[56] References Cited

U.S. PATENT DOCUMENTS

| | | | |
|---|---|---|---|
| 3,819,999 | 6/1974 | Platt | 318/609 |
| 4,801,851 | 1/1989 | Gordon et al. | 315/367 |
| 4,872,209 | 10/1989 | Blanken | 330/294 |

*Primary Examiner*—William M. Shoop, Jr.
*Assistant Examiner*—Saul M. Bergmann
*Attorney, Agent, or Firm*—Pearne, Gordon, McCoy & Granger

[57] ABSTRACT

A control system having an open loop transfer function G expressed by a transfer function $G_2$ of one control component having at least one integration element and a mass transfer function $G_1$ of other control components and a saturation level of the other components expressed by the transfer function $G_2$ set lower than that of the component expressed by $G_1$.

2 Claims, 3 Drawing Sheets

CONTROL SYSTEM

This is a continuation of application Ser. No. 271,727, filed Nov. 15, 1988 now abandoned.

BACKGROUND OF THE INVENTION

When a control circuit having conditioned stability is controlled such as especially electrically conducted by closing a power switch or shocked by external disturbance, the control circuit tends to oscillate. "Seigyo Kohgaku" (Control Engineering), fifth Chapter, seventh verse issued by Denki Gakkai (Electric Society), Japan and written by a writer member, Ichiro Katoh says that when a control system has $\omega$ (angular frequency) on a Bode diagram having negative inclination ranges of third order, fourth order and less among the frequencies from 0 to the response frequency (angular frequency corresponding to loop gain =0 dB), it becomes unstable when the loop gain is lowered because the phase at the response frequency exceeds negative $\pi$. Therefore, if the control system input exceeds the operation range of the amplifiers included in the control system or the normal operation range of other control components, the system oscillates because it has the condition similar to that on which the loop gain is lowered. Once it oscillates, the oscillation never stops even though the input is removed from the control system. However, if the oscillation is forced to stop by any means, it can be normally operated later. Such a condition of the control system is called conditioned stability.

In prior art, external disturbance compression ratio becomes equal to loop gain at a frequency range substantially lower than the response frequency. Therefore, the response frequency is required to be higher in order to make the loop gain higher so as to improve the external disturbance compression effect and to avoid the conditioned stability of the control system.

The maximum response frequency of an automatic control system is limited by mechanical transfer functions from a drive motor to control condition detector means such as potentiometers. In order to heighten the response frequency, the drive motor, a controlled body and the control condition detector means are required to be mechanically connected in a light and rigid manner, but it is economically and technically limited.

SUMMARY OF THE INVENTION

Accordingly, it is a principal object of the invention to provide a control system adapted to be stably operated in an unconditional manner even though it is one of conditioned stability having negative inclination ranges of third order, fourth order and less on Bode's diagram in order to heighten loop gain even though response frequency is low.

It is another object of the invention to provide a control system adapted to never oscillate when excessive signals such as an electrical surge upon closing of a power switch or external disturbance occur.

In accordance with the present invention, there is provided a control system having an open loop transfer function G expressed by the following expression when a transfer function of one control component having at least one integration element is expressed by $G_2$ and a mass transfer function of other control components is expressed by $G_1$;

$$G = G_1 \cdot (1 + G_2)$$

and a saturation level of the component expressed by the transfer function $G_2$ being set lower than that of the components expressed by $G_1$.

In an emergency when signals of more than predetermined level occur due to external disturbance, for example, within the control system, the components become saturated and as a result have the condition similar to that on which the loop gain is lowered. During the emergency, the component expressed by the transfer function $G_2$ is saturated before the component expressed by the transfer function $G_1$ is saturated and the transfer function $G_2$ is so set as $1 \gg G_2$ when the transfer function $G_1$ is saturated, which causes the minus order on the Bode's diagram of the open loop transfer function to decrease.

BRIEF DESCRIPTION OF THE DRAWINGS

The above and other objects and features of the invention will be apparent from the description of the embodiment of the invention with reference to the accompanying drawings in which.

DETAILED DESCRIPTION OF THE PREFERRED EMBODIMENTS

Figure 1:
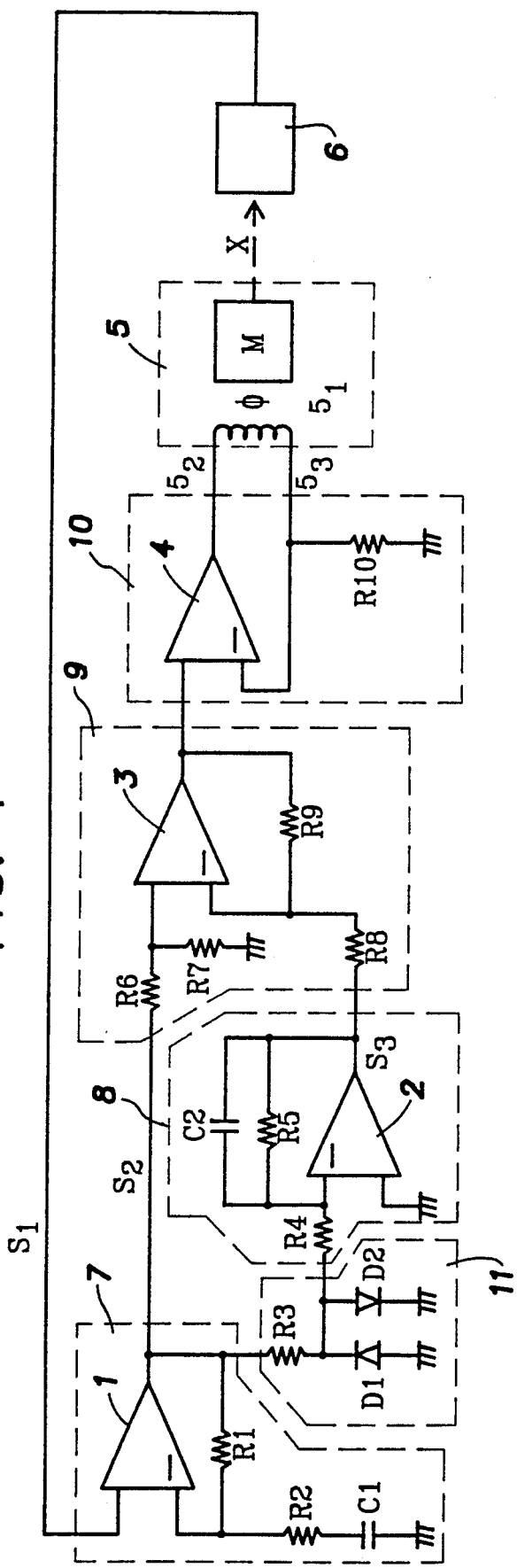
FIG. 1 is a schematic diagram of a control system used for a position control circuit constructed in accordance with one embodiment of the invention.

Referring now to FIG. 1, there is illustrated a control system used for position control and constructed in accordance with one embodiment of the invention.

An operational amplifier 1 has a positive input terminal to which a displacement voltage signal S1 is input and a negative input terminal connected through a resistor R1 to its output terminal and through a resistor R2 and a capacitor C1 to ground. A differentiation circuit 7 is formed by the operational amplifier 1, the resistors R1 and R2 and the capacitor C1. The output terminal of the operational amplifier 1 is connected through a resistor R3 to a cathode of a diode D1 and to an anode of a diode D2. The output terminal of the operational amplifier 1 is also connected through the resistor R3 and a resistor R4 to a negative input terminal of an operational amplifier 2.

A capacitor C2 and a resistor R5 are connected in parallel to each other between the negative input terminal and an output terminal of the operational amplifier 2. An anode of the diode D1, a cathode of the diode D2 and a positive input terminal of the operational amplifier 2 are connected to ground, respectively. A limiter circuit 11 is formed by the resistor R3 and the diodes D1 and D2 while an integration circuit 8 is formed by the resistors R4 and R5, the capacitor C2 and the operational amplifier 2.

An operational amplifier 3 has a positive input terminal connected through a resistor R6 to the output terminal of the operational amplifier 1 and through a resistor R7 to ground and a negative input terminal connected through a resistor R9 to its output terminal and through a resistor R8 to an output terminal of the operational amplifier 2. An addition circuit 9 is formed by the operational amplifier 3 and the resistors R6 through R9 because the integration circuit 8 is of an inversion type.

An operational amplifier 4 has a positive input terminal connected directly to the output terminal of the operational amplifier 3 and an output terminal connected to one motor terminal $5_2$ of an internal coil $5_1$ of a DC motor 5. The operational amplifier 4 also has a minus input terminal connected through a resistor R10 to ground and also to another motor terminal $5_3$ of the internal coil $5_1$. A current drive circuit 10 is formed by the operational amplifier 4 and the resistor R10.

The DC motor 5 has magnetic field $\phi$ expressed by drive force constant (newton/ampere) and formed of magnet and also has motor mass M (kg).

A position detector 6 is provided for detecting a displacement condition of a moving article (not shown) displaced by a function of the DC motor 5. The position detector 6 has a displacement voltage signal S1 corresponding to the position displacement x of the moving article and output to the plus input terminal of the operational amplifier 1.

Figure 2:
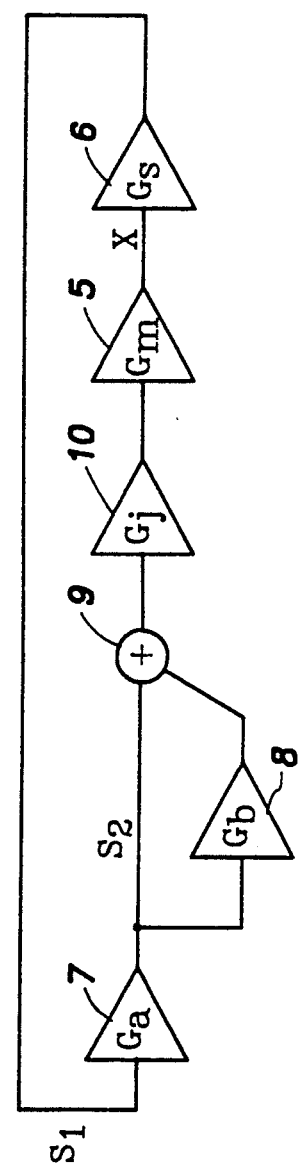
FIG. 2 is a block diagram of the control system of FIG. 1 having a limiter circuit removed therefrom.

FIG. 2 shows a block diagram of the control system of FIG. 1 with the limter circuit 11 removed. In FIG. 2, the reference codes Ga, Gb, Gj, Gm and Gs designate transfer functions of respective blocks of the control system.

If s is j $\omega$ ($\omega$ is angular frequency), the transfer function Ga of the differentiation circuit 7 is expressed by;

$$Ga = (1 + s \cdot \tau a)/(1 + s \cdot \tau a/Aa) \qquad (1)$$

wherein $\tau a$ and Aa are constants determined by the values of the resistors R1 and R2 and the capacitor C1, while the transfer function Gb of the integration circuit 8 is expressed by;

$$Gb = Ab/(1 + s \cdot \tau b) \qquad (2)$$

wherein Ab and $\tau b$ are constants determined by the values of the resistors R4 and R5 and the capacitor C2.

The relation of the transfer function Gj of the current drive circuit 10, the transfer function Gm expressing the relation of driving current i for the DC motor 5 with the position displacement x of the moving article and the transfer function Gs expressing the relation of the position displacement x with the displacement voltage signal S1 from the position detector 6 is expressed by;

$$Gj \cdot Gm \cdot Gs = K/s^2 \qquad (3)$$

wherein K is constant determined by a value of the resistor R10 for the current drive circuit 10 and the characteristics of the DC motor.

Accordingly, the open loop transfer function Go of the control system is expressed by;

$$\begin{aligned} Go &= Gj \cdot Gm \cdot Gs \cdot Ga(1 + Gb) \\ &= (K/s^2) \cdot (1 + s \cdot \tau a)/(1 + s \cdot \tau a/Aa) \cdot \\ &\quad (1 + s \cdot \tau b/(1 + Ab))/(1 + s \cdot \tau b) \end{aligned} \qquad (4)$$

wherein K' is expressed by K' = (1 + Ab).

The open loop transfer function G of the circuit of FIG. 2 is generally expressed by the following expression:

$$G = G_1 \cdot (1 + G_2)$$

wherein $G_1$ corresponds to (Gj·Gm·G$_5$·Ga) while $G_2$ corresponds to the transfer function Gb of the integration circuit 8 of FIG. 2.

By forming the control system having the open loop transfer function Go in a negative feedback loop, the control system is operated so that the displacement voltage signal S1 input to the differentiation circuit 7 becomes about 0 V. Thus, the moving article can be controlled to a predetermined position by preliminarily considering and setting the position of the displacement x of the moving article corresponding to 0 V of the displacement voltage signal S1.

It will be noted that the moving article can be controlled to the predetermined position even though the control system is so constructed that a bias voltage for adjusting the position to a predetermined one is applied to the displacement voltage signal S1.

Figure 3:
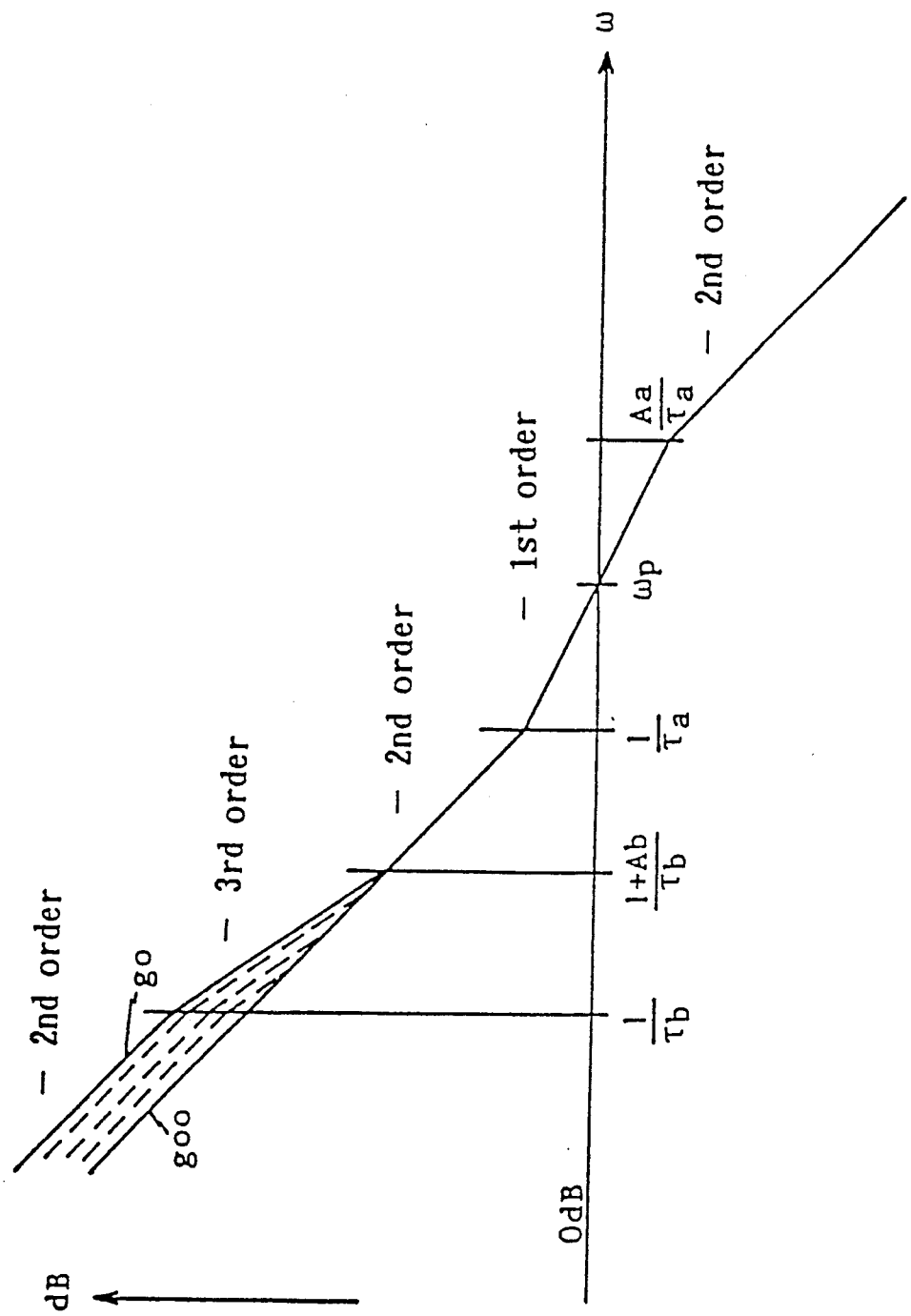
FIG. 3 illustrates a gain to frequency curve of an open loop transfer function of the control system of FIG. 2.

FIG. 3 shows a gain to frequency curve go of the open loop transfer function Go (the above expression (4)) of the control system of FIG. 2. In FIG. 3, a vertical axis indicates gain by dB while a horizontal axis indicates angular frequency $\omega$ by logarithm scale.

Respective angular frequencies $1/\tau b$, $(1 + Ab)/\tau b$, $1/\tau a$, Aa/$\tau a$ at respective bend points of FIG. 3 and gains determined by the values of the resistors and the capacitors forming the blocks are set as shown in FIG. 3. In other words, the relation of $1/\tau b < (1 + Ab)/\tau b < 1/\tau a < Aa/\tau a$ is established and the gain of 0 dB is set at the center (logarithm scale) of $1/\tau a$ and Aa/$\tau a$. Thus, it will be noted that the control system of FIG. 2 becomes one of conditioned stability having the negative inclination range of third order and therefore has the oscillation state on the aforementioned conditions.

In order to avoid the oscillation state of the control system, the limiter circuit 11 is provided on the input side of the integration circuit 8 as shown in FIG. 1. The operation of the control system of the invention will be described hereinbelow.

Considering the control system having the integration circuit 8 removed therefrom, the open loop transfer function Goo is expressed by the following expression.

$$\begin{aligned} Goo &= Ga \cdot Gj \cdot Gm \cdot Gs \\ &= (K/s^2)(1 + s \cdot \tau a)/(1 + s \cdot \tau a/Aa) \end{aligned} \qquad (5)$$

Thus, it will be noted that the gain to frequency curve is as indicated by goo of FIG. 3. In this case, since the control system has no negative inclination range of thrid order, the control system will never oscillate, at least in theory.

The limiter circuit 11 of FIG. 1 has a saturation level so set as to equivalently saturate the integration circuit 8 by a signal level substantially lower than those of the other circuits. The saturation level of one circuit is the level of the displacement voltage signal S1 when an output signal from the circuit will be limited or constant upon further increase in the level of the displacement voltage S1, assuming that the circuit is operated by a predetermined power voltage and other circuits are always normally operated. Accordingly, if the limiter circuit 11 of FIG. 1 is set as aforementioned, when the level of the displacement voltage signal S1 increases, the integration circuit 8 is first saturated so as to limit the output signal $S_3$. Thus, as the level of the signal s1 increases, exceeding the saturation level, the ratio of the signal $s_3$ to the signal $s_2$ decreases. This causes the effect of the integration circuit to relatively decrease in a gradual manner. Thus, the gain to frequency curve approaches the gain curve of the transfer function Goo from that of the transfer function Go as indicated by the dotted lines of FIG. 3.

Figure 4:
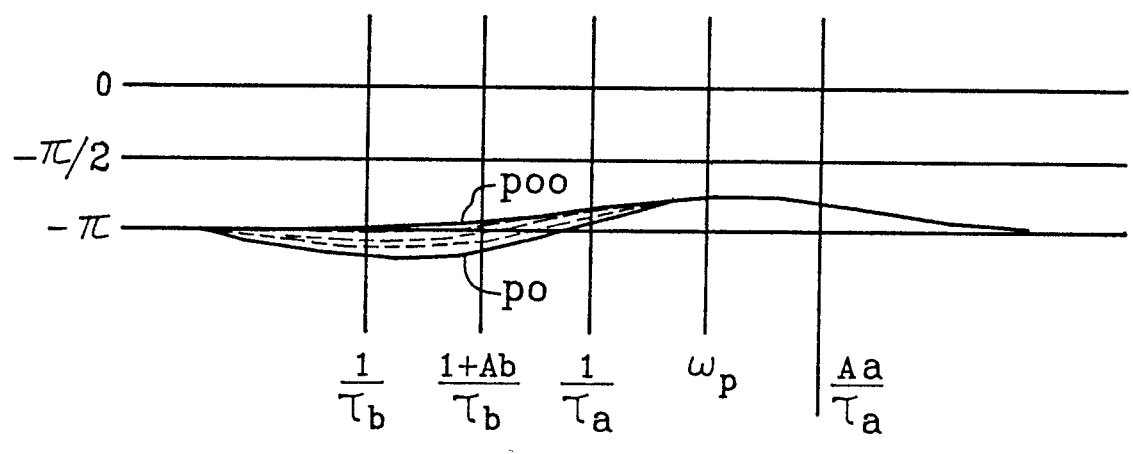
FIG. 4 illustrates the phase response corresponding to the open loop transfer function of FIG. 3 for the control system of FIG. 2.

In this manner, when excessive signals occur due to the suege on closing the power switch or the external disturbance within the control system, the integration circuit 8 becomes equivalently saturated by the function of the limiter circuit 11, which causes the gain to frequency curve to approach the gain curve of the transfer function Goo from that of the transfer function Go. Thereafter, when components other than the integration circuit 8 become saturated, the line of 0 dB moves relatively upward so that the response frequency $\omega$ p moves toward the second order attenuation curve range. However, since, at that time, the gain to frequency curve closely approaches the gain curve of the transfer function Goo, the phase at the response frequency never exceeds negative $\pi$ even though the phase margin decreases as the response frequency moves. This is shown in FIG. 4 wherein po and poo are the frequency-to-phase curves of the open loop transfer functions Go and Goo, respectively.

This causes the control system to never oscillate, at least in theory.

Although one embodiment of the invention has been illustrated and described with reference to the accompanying drawings, it will be understood by those skilled in the art that it is by way of example, and that various changes and modifications may be made without departing from the spirit and scope of the invention. Although, in the illustrated embodiment, the invention is applied to control the position of a moving article, it can be applied to other usage so long as the control system uses the integration circuit. Furthermore, although, in the illustrated embodiment, the integration circuit is saturated by the limiter circuit, it may be saturated by any other means. The integration circuit 8 itself may be so constructed that it is saturated by a predetermined level of its output signal $S_3$, for example. Thus, it should be noted that the invention is intended to be defined only by the appended claims.

What is claimed is:

1. A control system comprising a differentiation circuit having an input and an output, said output of said differentiation circuit being connected to an input of an integration circuit, an output of said integration circuit and said output of said differentiation circuit being added and connected to a motor drive circuit, said motor drive circuit being connected to a motor which positions a moving article, a displacement condition of said moving article being sensed by a controlled variable detection means, said controlled variable detection means having an output connected to the input of said differentiation circuit wherein a transfer function of one control component having a first saturation level and comprising said integration circuit is expressed by G2, a mass transfer function of other control components having a second saturation level and comprising said differentiation circuit, said motor drive circuit, said motor and said controlled variable detection means is expressed by G1, and having an open loop transfer function G being expressed by the following expression:

$G = G1\,(1 + G2)$ said first saturation level being set lower than said second saturation level.

2. A control system as set forth in claim 1, and wherein said one control component is saturated by a limiter circuit comprising a resistor and diodes.

* * * * *